Sept. 28, 1948.                W. A. WILSON                    2,450,215
                       DOLLY FOR TRAILERS AND THE LIKE
Filed July 27, 1946                                        2 Sheets-Sheet 1

INVENTOR.
William A. Wilson
BY
Henry Molz
ATTORNEY.

Sept. 28, 1948. W. A. WILSON 2,450,215
DOLLY FOR TRAILERS AND THE LIKE
Filed July 27, 1946 2 Sheets-Sheet 2
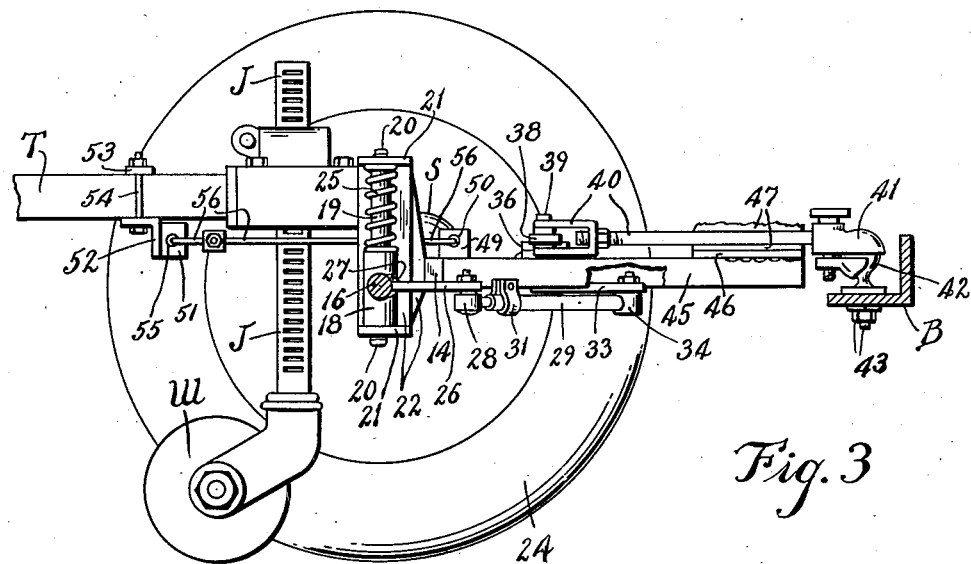
Fig. 3
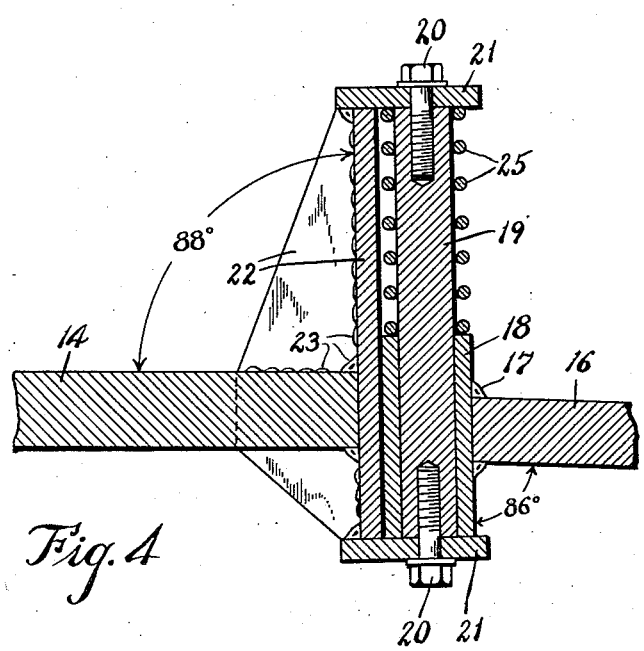
Fig. 4
INVENTOR.
William A. Wilson
BY 
ATTORNEY.

Patented Sept. 28, 1948

2,450,215

UNITED STATES PATENT OFFICE 2,450,215

DOLLY FOR TRAILERS AND THE LIKE

William A. Wilson, Glendale, Calif.

Application July 27, 1946, Serial No. 686,773

6 Claims. (Cl. 280—33.55)

My invention consists generally stated, in certain novelties of structure and in the combination of operating elements as hereinafter more specifically described, illustrated and claimed, and, specifically, it consists in providing a dolly for trailers and the like operatable unlike any of similar scope the market affords, and wherein a marked improvement in stability without an increase in structural weight is obtained, as well as a decided improvement in the handling and operation of the towing vehicle results.

It is therefore an important object of my invention to provide a precision built dolly wherein the accuracy of its component parts is highly essential to balanced operation and the outstanding results claimed.

An important object of the invention is the provision of a dolly designed for use at the front end of the vehicle being towed, regardless of type, purpose and use, and to this end, it is equally adaptable for towing passenger automobiles, trucks, scrapers, earth rollers, etc., irrespective of the design or weight of either towing or towed vehicle.

A further object of the invention is the provision of a dolly highly flexible in its steering and movability, whereby friction and road heat affecting the bearings and tires of both the towing and towed vehicles are substantially reduced so as to assure longer life and troublefree dolly advantages.

A further important object of the invention is the provision of a dolly permitting forward and reverse movement of the dolly connected vehicles without strain or drag as freely as if either of the vehicles were separately driven.

A further important object of the invention is the provision of a dolly whereby the towing vehicle is approximately subjected to but ten per cent (10%) of the dead weight load, the other ninety per cent (90%) being absorbed by the dolly.

A further important object of the invention is the provision of a dolly whereby jackknifing and buckling at road turns when travelling at high speeds is completely eliminated, yet permitting the vehicles to rise or lower on their respective axles in conformity with the contour of the roadway, and this, without undue strain on either the vehicles or dolly.

A still further important object of the invention is the provision of a dolly embodying an axle and wheel adjusting means whereby said units are easily and quickly brought into proper alignment with the towing vehicle whatever its type.

And a still further object of the invention is the provision of a dolly designed to eliminate side sway resulting from operation of the towing vehicle, wind, and/or back draft created by vehicles travelling in the opposite direction.

Additional objects of the invention will readily be apparent from the following description of the same, it being understood that correct machining and placement of the component parts of the invention is highly essential for the attainment of the objectives described.

I attain these objects by the dolly illustrated in the accompanying drawings, in which:

Figure 3 is a section on line 3—3 of Figure 1, and

Figure 4 is a section on line 4—4 of Figure 1.

Similar reference characters indicate like parts throughout the several views.

Figure 1:
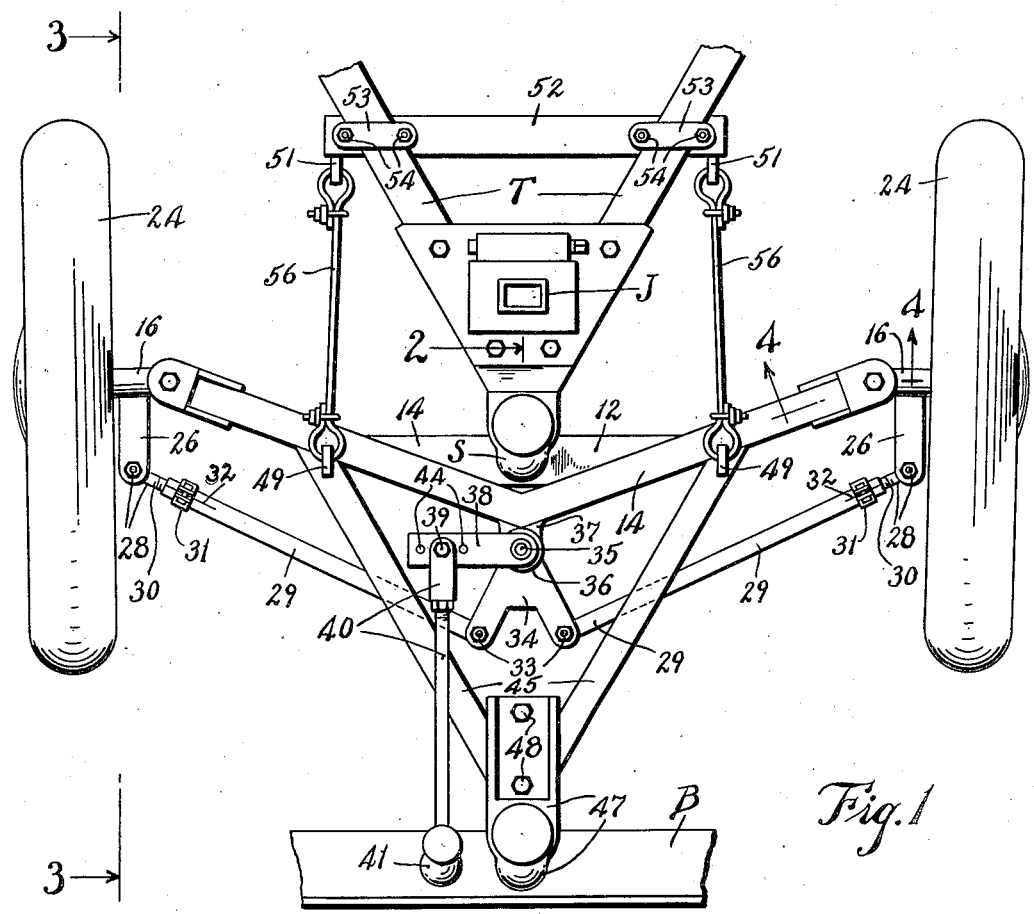
Figure 1 is a top plan view of the dolly with a fragment of a trailer attached thereto.

Thus the drawings depict the forward end T of a trailer undercarriage having a conventional jack J; and a ball-socket S is shown supported on a ball 10 which is attached by a bolt and nut 11 to a cross-bar 12 of the dolly.

The conventional ball 13 is attached to a towing bracket B of a towing vehicle as by a bolt and nut 13'. A broad V-shaped axle tree 14 is provided with a cross-bar 12 attached as by a weld 15 to the rear of the axle-tree between its ends. The ball 10 is mounted on bar 12 so that the vertical axis of the ball is approximately six inches forward of the axis of a pair of wheel spindles 16 which are pivotly connected to the ends of the axle tree.

Each of the spindles 16 is attached at its inner end as by a weld 17 to a sleeve 18 disposed so as to swing about a post 19 fixed at its ends as by a bolt 20 to ends 21 of a bracket 22 attached as by a weld 23 to each of the ends of the axle tree 14, and thereby providing a pivot for the inner ends of the spindles 16 about which revolve the dolly wheels 24.

A spring 25 is disposed about a post 19 between the upper end of the sleeve 18 and the upper end 21 of the bracket 22. It provides a resilient support for the forward end of the trailer.

The upper ends of the brackets 22 and the posts 19 are canted inwardly 2 degrees from the vertical, and the axis of the spindles 16 are each canted downwardly 4 degrees from the horizontal axis of the axle tree 14. This compensates for the springing action of the axle.

Conventional "toe-in" is provided for the wheels 24.

Steering arms 26 attached as by a weld at 27 to the spindles 16 and having ball and socket joints 28 at their outer ends connect to steering links 29. These links are internally threaded at the ends adjacent said arms 26 to receive the threaded end 30 of the ball and socket joint 28.

Clasping bands 31 encircle the threaded ends of the links 29 which are split at 32 to provide a lock-nut effect. The other ends of the links 29 are each connected by a ball and socket joint 33 to the end of a bell crank arm 34 which is bifurcated to space the ball and socket joints 33 slightly on opposite sides of the center line of the dolly when the wheels are set to move straight ahead.

Figure 2:
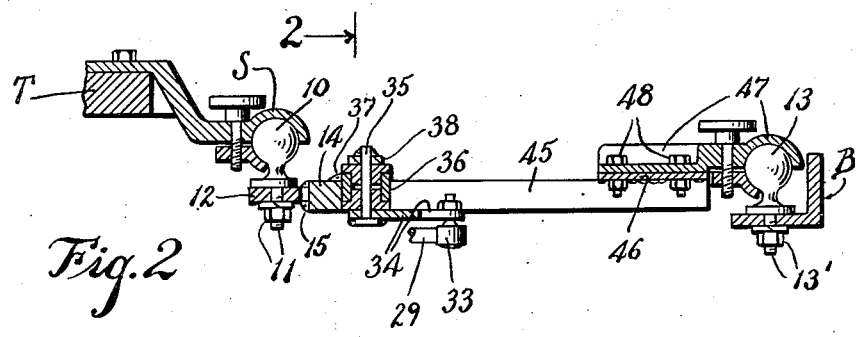
Figure 2 is a sectional view on line 2—2 of Figure 1.

The arm 34 is fixed to the lower end of a short vertical shaft 35 journaled in a bearing 36 attached as by a weld 37 to the forward edge of the axle tree 14. The upper end of said shaft 35 has a bell crank arm 38 welded or otherwise fixed thereto as shown in Fig. 2.

The arm 38 is pivotly connected as at 39 by a link 40 which is adjustable in length, to a ball 42 attached as by a bolt and nut 43 to the bracket B. Said arm 38 is provided with alternate holes 44 for adjustable positioning of the pivot 39.

A V-shaped tongue 45 is attached by welding or otherwise to the forward edge of the axle tree 14 with the apex of the V adjacent the bracket B. The forward end of the tongue 45 has a plate 46 welded thereon to provide a mounting for a ball-socket 47 which is attached to the plate 46 as by bolts 48.

The ball-socket 47 is provided for connection with the ball 13 and provides a means for towing the dolly.

A pair of upwardly extending blocks 49 are fixed upon the rearward ends of the tongue 45. Said blocks 49 are each provided with a hole 50. A pair of blocks 51 similar to the blocks 49 are attached at opposite ends of a cross-bar 52 which is attached by a pair of clamp plates 53 and bolts 54 to the end T of the trailer.

Holes 55 are provided in the blocks 51 and a pair of cables 56 connect each of the blocks 51 with a block 49 directly opposite thereto. Said cables provided a snubbing action. They are flexible, however, to permit the dolly and trailer to have relative vertical movement and the forward end of the tongue 45 to rise or lower in conformity with any irregularity of the road surface.

The jack J with wheel W attached, is raised after the trailer is connected to the dolly. For convenience and as a preventive to exclude road dirt and other foreign substances from contacting the jack, it may readily be covered with a canvas sack or covering (not shown).

Connecting the towing vehicle with the trailer and the latter with the vehicle to be towed is accomplished in line with the foregoing recital in the conventional manner. It offers no difficulties, and may quickly be done.

The flexible cables 56 prevent the trailer from "jackknifing" in negotiating turns while the link 40 is being moved responsive to any turning or curve-negotiating movement of the towing vehicle, and operates crank arms 34 and 38 so that steering links 29 and steering arms 26 will turn the wheels 24 in accordance with the turning of the towing vehicle.

Readily produced from materials the open market affords and at no great cost, the invention furnishes a highly reliable and satisfactory dolly for the uses and purposes herein described.

I am aware that modifications in structure might from time to time suggest themselves without departing, however, from the scope thereof herein shown and described. Hence, I do not limit my invention to the exact description and structural embodiments herein disclosed, but what I do claim is:

1. In a dolly for effecting a load supporting and draft connection between a towing vehicle and a vehicle to be towed, an axle, posts fixed to said axle, sleeves vertically movably and turnably supported on said posts, spindles carried by said sleeves, wheels mounted on said spindles, spring means yieldably resisting relative vertical movement of said posts and sleeves, means connected with said axle affording draft connections with the towing and towed vehicles in such manner that the weight of the forward end of the towed vehicle is supported by said wheels through said spring means, and steering gear associated with said axle, sleeves and spindles, including means affording connection with said towing vehicle whereby said wheels will track with the steering of said towing vehicle.

2. In a dolly for effecting a load supporting and draft connection between a towing vehicle and a vehicle to be towed, an axle, posts fixed to said axle, sleeves vertically movably and turnably supported on said posts, spindles carried by said sleeves, wheels mounted on said spindles, spring means yieldably resisting relative vertical movement of said posts and sleeves, means connected with said axle affording draft connection with the towing and towed vehicles in such manner that the weight of the forward end of the towed vehicle is supported by said wheels through said spring means, steering gear associated with said axle, sleeves and spindles, including means affording connection with said towing vehicle whereby said wheels will track with the steering of said towing vehicle, said posts being inclined from the vertical, and said spindles being inclined from the horizontal.

3. In a dolly for effecting a load supporting and draft connection between a towing vehicle and a vehicle to be towed, an axle, steering spindles mounted on said axle, wheels on said spindles, means affording a swivel connection of the axle with a vehicle to be towed, a rigid tongue projecting forwardly from the axle, means on said tongue affording a swivel draft connection thereof with said towing vehicle, and steering gear connected with said axle and spindles including means affording an operative connection of said gear with said towing vehicle whereby the wheels on said axle will be turned responsive to the steering of said towing vehicle, said axle being V-shaped with its apical portion centered at a point forwardly of the ends of the axle, a cross member fixed to said axle rearwardly of said apical portion and supporting said means for effecting a draft connection with the towed vehicle.

4. In a dolly for effecting a load supporting and draft connection between a towing vehicle and a vehicle to be towed, an axle, steering spindles mounted on said axle, wheels on said spindles, means affording a swivel connection of the axle with a vehicle to be towed, a rigid tongue projecting forwardly from the axle, means on said tongue affording a swivel draft connection thereof with said towing vehicle, steering gear connected with said axle and spindles including means affording an operative connection of said steering gear with said towing vehicle whereby the wheels on said axle will be turned responsive to the steering of said towing vehicle, said axle being V-shaped with its apical portion centered at a point forwardly of the ends of the axle, a cross member fixed to said axle rearwardly of said apical portion and supporting means for effecting a draft connection with the towed vehicle, said cross member and said tongue being substantially coplanar with said axle.

5. In a dolly for effecting a load supporting and draft connection between a towing vehicle and a vehicle to be towed, an axle, posts fixed to said axle, sleeves vertically movably and turnably supported on said posts, spindles carried by said sleeves, wheels mounted on said spindles, spring means yieldably resisting relative vertical movement of said posts and sleeves, means connected with said axle affording draft connections with the towing and towed vehicles in such manner that the weight of the forward end of the towed vehicle is supported by said wheels through said spring means, steering gear associated with said axle, sleeves and spindles, including means affording connection with said towing vehicle whereby said wheels will track with the steering of said towing vehicle, said axle being V-shaped with its apical portion extended toward said towing vehicle, a cross member on said axle rearwardly of said apical portion, and a rigid tongue projecting forwardly of said axle and together with said cross member supporting said means for affording draft connections with said towing and towed vehicles.

6. In a dolly for effecting a load-supporting and draft connection between a towing vehicle and a vehicle to be towed, an axle, brackets fixed to the ends of said axle, posts fixed to said brackets, sleeves vertically slidably and rotatably mounted on said posts, spindles fixed to said sleeves, wheels mounted on said spindles for supporting the dolly, springs arranged on said posts to yieldingly resist relative vertical movement of said spindles and axle means affording a swiveled draft connection of said axle with a vehicle to be towed, a tongue projecting forwardly from said axle, means on said tongue affording a swiveled draft connection of said tongue with the towing vehicle, and steering gear connected to said spindles and including a steering link adapted to be connected to the towing vehicle whereby said vehicle will be turned responsive to the turning of the towing vehicle.

WILLIAM A. WILSON.

REFERENCES CITED

The following references are of record in the file of this patent:

UNITED STATES PATENTS

| Number | Name | Date |
| --- | --- | --- |
| 1,247,201 | Yoder | Nov. 20, 1917 |
| 1,807,303 | Burkett | May 26, 1931 |
| 1,822,178 | Thoen | Sept. 8, 1931 |
| 2,410,241 | Schramm | Oct. 29, 1946 |